United States Patent
Hisada et al.

(10) Patent No.: US 12,428,803 B2
(45) Date of Patent: Sep. 30, 2025

(54) DRIVE TRANSMISSION DEVICE, CONSTRUCTION MACHINE, DRIVE TRANSMISSION METHOD, AND STORAGE MEDIUM STORING PROGRAM

(71) Applicant: NABTESCO CORPORATION, Tokyo (JP)

(72) Inventors: Kazuki Hisada, Tokyo (JP); Etsuro Komori, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 738 days.

(21) Appl. No.: 17/700,683

(22) Filed: Mar. 22, 2022

(65) Prior Publication Data

US 2022/0316171 A1 Oct. 6, 2022

(30) Foreign Application Priority Data

Mar. 31, 2021 (JP) ................................. 2021-061600
Sep. 1, 2021 (JP) ................................. 2021-142636

(51) Int. Cl.
*F16H 48/20* (2012.01)
*E02F 3/32* (2006.01)
(Continued)

(52) U.S. Cl.
CPC ............... *E02F 3/425* (2013.01); *E02F 3/32* (2013.01); *E02F 9/202* (2013.01); *E02F 9/2079* (2013.01);
(Continued)

(58) Field of Classification Search
CPC ... E02F 3/425; E02F 3/32; E02F 9/202; E02F 9/2079; E02F 3/427; E02F 3/3604;
(Continued)

(56) References Cited

U.S. PATENT DOCUMENTS 4,838,118 A * 6/1989 Binkley ................. F16H 48/30
475/86
5,456,641 A 10/1995 Sawase
(Continued)

FOREIGN PATENT DOCUMENTS

EP 2620311 A1 * 7/2013 ........... B60K 17/046
JP 63-300131 A 12/1988

OTHER PUBLICATIONS

Extended European Search Report dated Aug. 25, 2022, issued in corresponding European Patent Application No. 22162969.4 (9 pgs.).
(Continued)

*Primary Examiner* — Justin Holmes
(74) *Attorney, Agent, or Firm* — Pillsbury Winthrop Shaw Pittman, LLP

(57) ABSTRACT

A drive transmission device in one embodiment of the disclosure includes a pair of output shafts, a differential, a clutch (power transmission unit), and a control unit. The pair of output shafts connected to a pair of speed reducers that are disposed to face each other. The differential receives a driving force from a drive source and outputs the driving force to the pair of output shafts; The clutch acts on the differential and takes a first state in which a load imbalance between the pair of output shafts is adjusted or a second state in which the pair of output shafts are rotated directly by the driving force. The control unit switches the state of the clutch based on difference information regarding a difference in rotation between the pair of speed reducers.

5 Claims, 7 Drawing Sheets

(51) Int. Cl.
  *E02F 3/42* (2006.01)
  *E02F 9/20* (2006.01)
  *F16H 48/22* (2006.01)

(52) U.S. Cl.
  CPC ....... *F16H 48/22* (2013.01); *F16H 2048/204* (2013.01)

(58) Field of Classification Search
  CPC ..... E02F 3/3609; E02F 3/3654; E02F 3/3681; E02F 3/437; F16H 48/22; F16H 2048/204; F16H 48/30; B60Y 2200/412
  See application file for complete search history.

(56) References Cited

U.S. PATENT DOCUMENTS

| | | | |
|---|---|---|---|
| 5,910,064 A | 6/1999 | Kuroki | |
| 6,561,939 B1* | 5/2003 | Knapke | F16H 48/22 |
| | | | 192/84.6 |
| 11,383,603 B2* | 7/2022 | Remboski | F16H 37/082 |
| 2019/0111778 A1* | 4/2019 | Remboski | B60K 17/046 |

OTHER PUBLICATIONS

Notice of Reasons for Refusal dated Mar. 25, 2025, issued in corresponding Japanese Patent Application No. 2021-142636 with English translation (8 pgs.).

\* cited by examiner

DRIVE TRANSMISSION DEVICE, CONSTRUCTION MACHINE, DRIVE TRANSMISSION METHOD, AND STORAGE MEDIUM STORING PROGRAM

CROSS-REFERENCE TO RELATED APPLICATIONS

This application is based on and claims the benefit of priority from Japanese Patent Application Serial Nos. 2021-061600 (filed on Mar. 31, 2021) and 2021-142636 (filed on Sep. 1, 2021), the contents of which are incorporated herein.

TECHNICAL FIELD

The present disclosure relates to a drive transmission device, a construction machine, a drive transmission method, and a storage medium storing a program.

BACKGROUND

Typical construction machines such as hydraulic excavators are equipped with a speed reducer. The hydraulic excavator has, for example, a boom, an arm rotatably coupled to the boom, and a bucket rotatably coupled to the other end of the arm on the opposite side to the boom via the speed reducer. As a related art, for example, an excavator having an electric linear actuator as an electric drive actuator for construction machines is disclosed (for example, see Japanese Patent Application Publication No. 63-300131).

In such an excavator, for example, if the speed reducer is provided only on one side of the coupling portion between the bucket and the arm, a moment load is generated only on the one side of the coupling portion during excavation, which increases chances of brake down. For this reason, it is desirable to provide the speed reducers on both sides of the bucket. However, when the speed reducer is provided on each side of the bucket, a slight misalignment may occur between the two speed reducers during the operation of the bucket, and loads on output shafts of the two speed reducers may be imbalanced. To address this, for example, a differential may be provided to eliminate the load imbalance between the output shafts.

When the differential is provided, gears in the differential rotate and revolve in a short time until the power is evenly distributed to the speed reducers disposed on the left and right sides. The gears then only revolve together with carriers of the speed reduces. Thus, the drive force continues to be transmitted only between the gears in the differential. Consequently, in the prior art, the gears are easily worn out, which may result in a short product life.

SUMMARY

The present disclosure provides a drive transmission device, a construction machine, a drive transmission method, and a program capable of preventing shortening of the product life of a differential.

(1) A drive transmission device according to one aspect of the disclosure includes: a pair of output shafts connected to a pair of speed reducers respectively, the pair of speed reducers facing each other; a differential receiving a driving force from a drive source and outputting the driving force to the pair of output shafts; a power transmission unit acting on the differential, the power transmission unit taking either one of a first state in which a load imbalance between the pair of output shafts is adjusted or a second state in which the pair of output shafts are rotated directly by the driving force; and a control unit switching the power transmission unit to the first state or the second state based on difference information regarding a difference in rotation between the pair of speed reducers.

With this configuration, after the load imbalance between the pair of output shafts has been eliminated by the differential motion, the driving force from the drive source to the differential is transmitted not only through the gears in the differential but also directly transmitted to the output shaft. Therefore, it is possible to prevent the drive force from being continuously transmitted only between the gears of the differential, and thereby wear of the gears is prevented.

(2) The difference information may be information indicating an input torque inputted to the differential from the drive source.

(3) The difference information may be information indicating a rotation speed inputted to the differential from the drive source.

(4) The control unit may maintain the power transmission unit in the first state until the value indicated by the difference information reaches a first threshold value, and switches the power transmission unit to the second state when the value reaches the first threshold value.

(5) The control unit may switch the power transmission unit to the first state when the value indicated by the difference information reaches a second threshold value higher than the first threshold value, and thereafter switch the power transmission unit to the second state.

(6) The difference information may be a value indicating a difference in input rotation between the pair of speed reducers, or a value indicating a difference in output rotation between the pair of speed reducers.

(7) A construction machine according to another aspect of the disclosure includes: a vehicle body; a movable member rotatably supported by the vehicle body; a movable member rotatably supported by the vehicle body; a movable member rotatably supported by the vehicle body; and a pair of speed reducers disposed to face each other. The drive transmission device includes: a pair of output shafts connected to the pair of speed reducers, respectively; a differential receiving a driving force from the drive source and outputting the driving force to the pair of output shafts; a power transmission unit acting on the differential, the power transmission unit taking either one of a first state in which a load imbalance between the pair of output shafts is adjusted or a second state in which the pair of output shafts are rotated directly by the driving force; and a control unit switching the power transmission unit to the first state or the second state based on difference information regarding a difference in rotation between the pair of speed reducers.

With this configuration, after the load imbalance between the pair of output shafts has been eliminated by the differential motion, the driving force from the drive source to the differential is transmitted not only through the gears in the differential but also directly transmitted to the output shaft. Therefore, it is possible to prevent the drive force from being continuously transmitted only between the gears of the differential, and thereby wear of the gears is prevented.

(8) A drive transmission method according to another aspect of the disclosure includes a step of causing a computer of a drive transmission device to perform a process of switching a power transmission unit to a first state or a second state based on difference information regarding a difference in rotation between a pair of speed reducers. The drive transmission device includes: a pair of output shafts connected to the pair of speed reducers respectively, the pair of speed reducers facing each other; a differential receiving a driving force from a drive source and outputting the driving force to the pair of output shafts; and the power transmission unit acting on the differential, the power transmission unit taking either one of the first state in which a load imbalance between the pair of output shafts is adjusted or the second state in which the pair of output shafts are rotated directly by the driving force.

(9) A non-transitory computer-readable storage medium storing a program according to yet another aspect of the disclosure for causing a computer of a drive transmission device to perform the steps of: switching a power transmission unit to a first state or a second state based on difference information regarding a difference in rotation between a pair of speed reducer. The drive transmission device includes: a pair of output shafts connected to the pair of speed reducers respectively, the pair of speed reducers facing each other; a differential receiving a driving force from a drive source and outputting the driving force to the pair of output shafts; and the power transmission unit acting on the differential, the power transmission unit taking either one of the first state in which a load imbalance between the pair of output shafts is adjusted or the second state in which the pair of output shafts are rotated directly by the driving force.

Advantageous Effects

A drive transmission device, a construction machine, a drive transmission method and a program according to the above aspects can prevent shortening of the product life of a differential.

DESCRIPTION OF THE EMBODIMENTS

The following describes embodiments of the present disclosure with reference to the drawings.
<Excavator>

Figure 1:
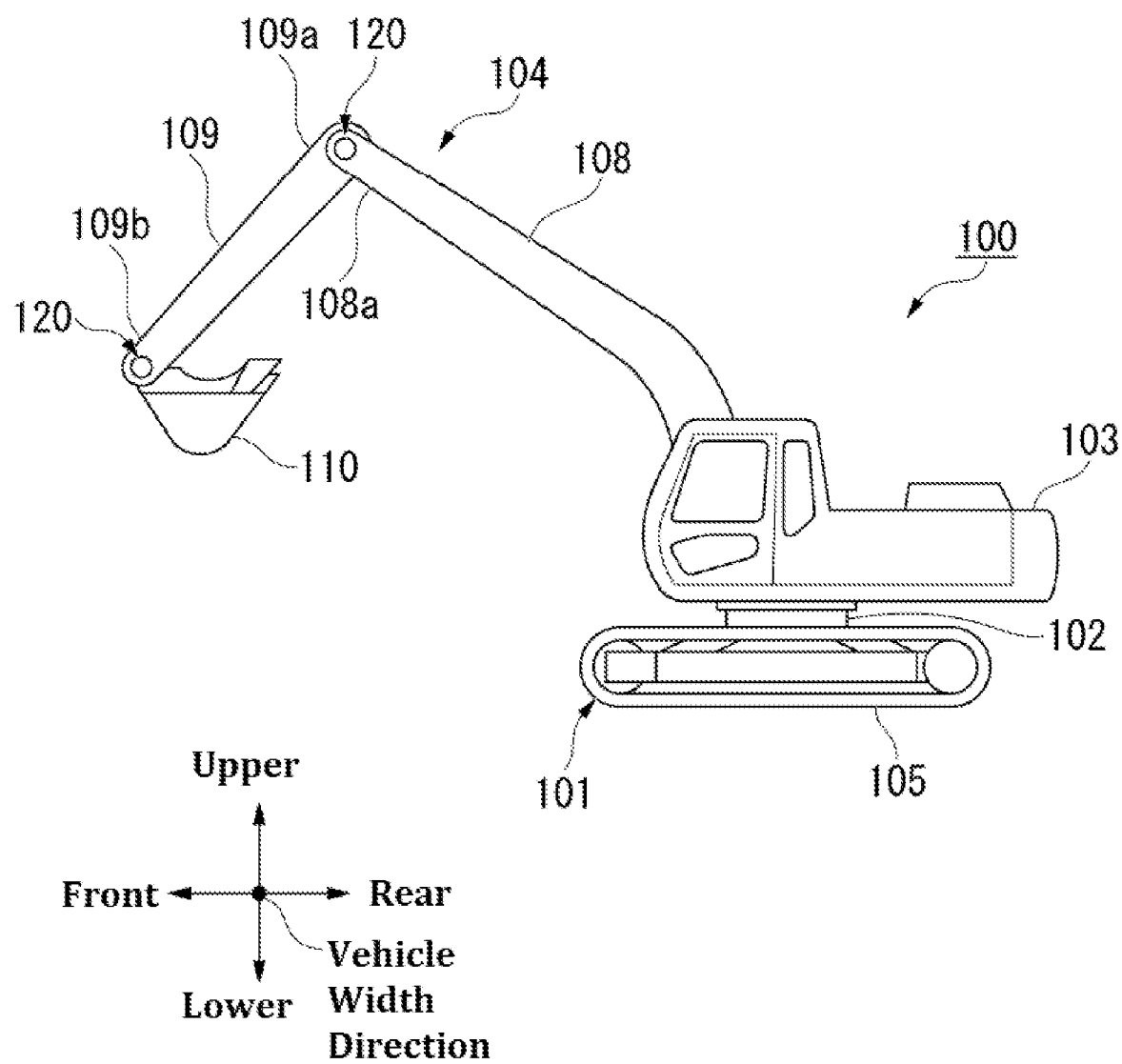
FIG. 1 schematically illustrates an excavator, which is an embodiment of a construction machine, viewed from the side.

FIG. 1 schematically illustrates an excavator 100, which is an embodiment of a construction machine, viewed from the side. In the following description, a direction in which an operator (not shown) of the excavator 100 faces (left side of FIG. 1) referred to as "front". A direction opposite to the front in the horizontal direction is referred to as "rear". The upper-lower direction of FIG. 1 is defined as a "vertical direction" of the excavator 100. A direction orthogonal to the front-rear direction and the vertical direction is referred to as a vehicle width direction. FIG. 1 shows the excavator 100 as viewed from the vehicle width direction.

As shown in FIG. 1, the excavator 100 includes an undercarriage 101, a slewing mechanism 102, a slewable upper structure 103, and an operating unit 104. A vehicle body, for example, includes the undercarriage 101, the slewing mechanism 102, and the slewable upper structure 103. The undercarriage 101 causes the excavator 100 to travel forward or backward. The undercarriage 101 includes, for example, two continuous tracks 105 arranged side by side in the vehicle width direction. Instead of the continuous tracks 105, the undercarriage 101 may include wheels. The slewing mechanism 102 is provided on top of the undercarriage 101. The slewable upper structure 103 is provided on top of the undercarriage 101 and is configured to be slewable relative to the undercarriage 101 by the slewing mechanism 102.

The operating unit 104 is provided on the slewable upper structure 103. The operating unit 104 is one example of a movable member. The operating unit 104 includes a boom 108, an arm 109, and a bucket 110. The boom 108, the arm 109, and the bucket 110 are rotatably coupled to each other via drive transmission devices 120. Specifically, one end of the boom 108 in the longitudinal direction is rotatably coupled to the slewable upper structure 103. One end 109a of the arm 109 in the longitudinal direction is rotatably coupled to the other end 108a of the boom 108 in the longitudinal direction via the drive transmission device 120. The bucket 110 is rotatably coupled to the other end 109b of the arm 109 in the longitudinal direction via the drive transmission device 120.

The drive transmission devices 120 provided in the coupling portions may all have the same configuration. The drive transmission device 120 is also provided at the coupling portion between the slewable upper structure 103 and the boom 108. In the following description, only the drive transmission device 120 provided between the bucket 110 and the other end 109b of the arm 109 in the longitudinal direction will be described, and description of the other drive transmission devices 120 will be hereunder omitted.

Figure 2:
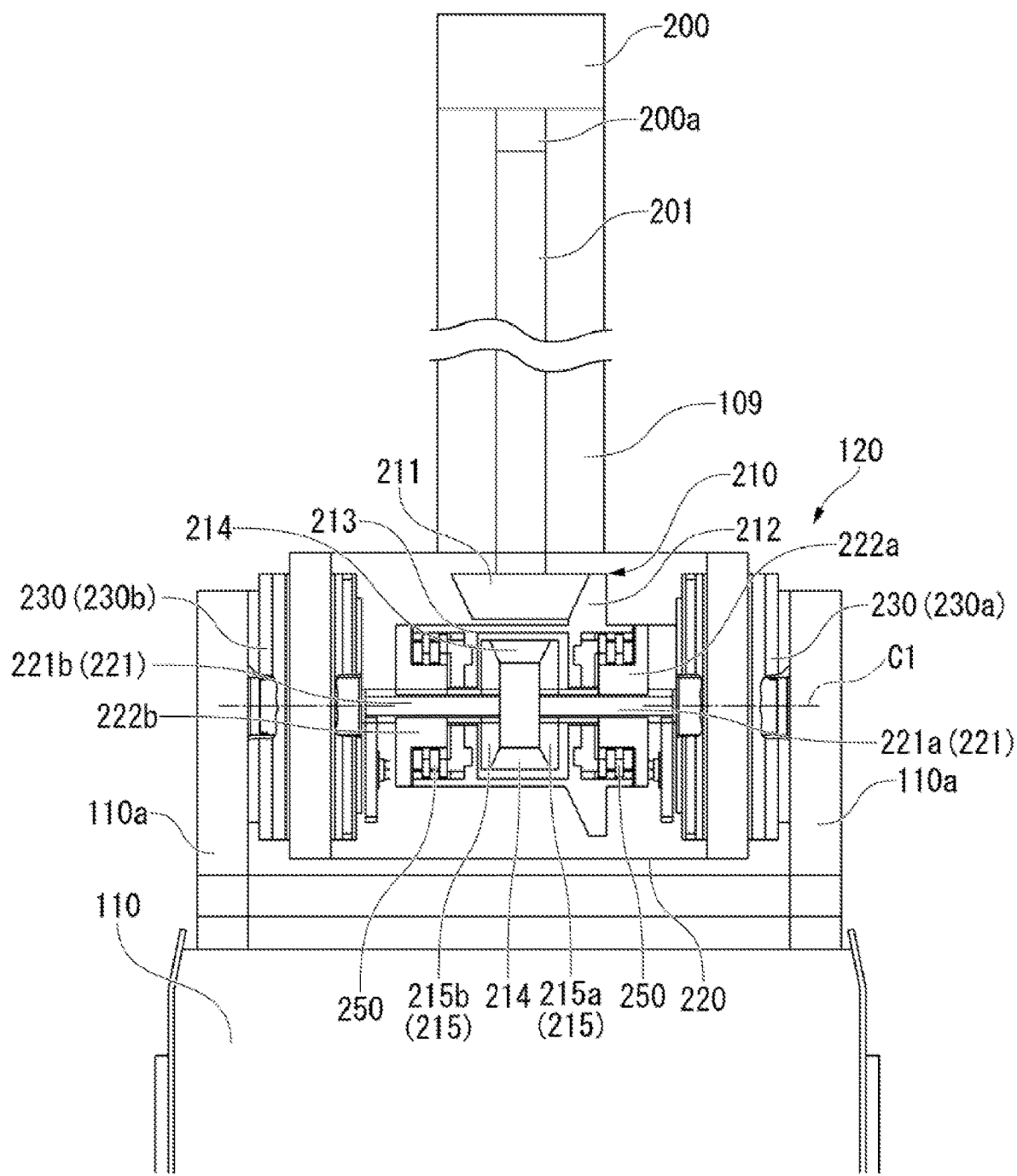
FIG. 2 schematically illustrates a drive transmission device in detail in a coupling portion between an arm and bucket of FIG. 1.
Figure 3:
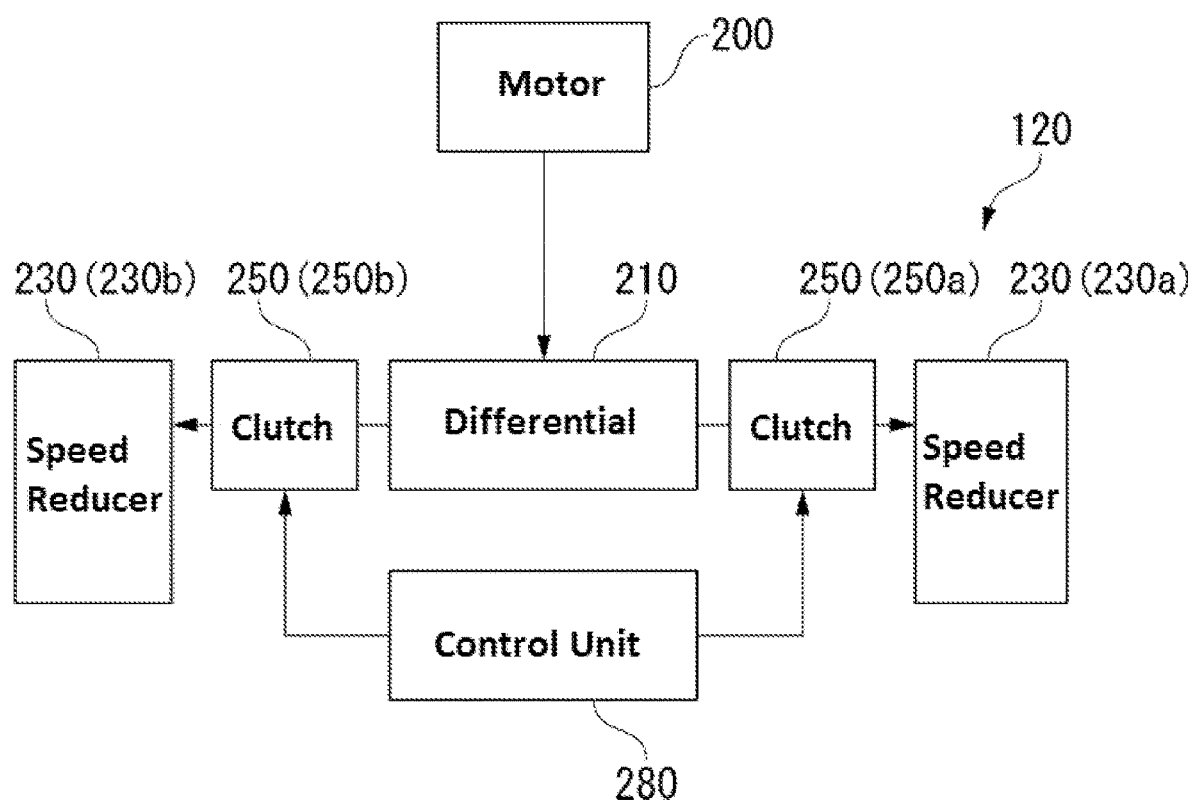
FIG. 3 schematically illustrates a configuration of the drive transmission device of FIG. 2.

FIG. 2 schematically illustrates the drive transmission device 120 at the coupling portion between the arm 109 and the bucket 110 in detail. FIG. 3 schematically shows the configuration of the drive transmission device 120. As shown in FIGS. 2 and 3, the drive transmission device 120 includes a differential 210, an output shaft 221, a clutch 250, and a control unit 280. A driving force of the motor 200 is inputted to the differential 210. Specifically, the motor 200 is provided inside the arm 109. The motor 200 generates a rotational force.

The motor 200 is an example of a drive source. The motor 200 is, for example, a so-called electric motor driven by electric power of an external power source (battery) provided in the slewable upper structure 103. As the motor 200, various electric motors such as a so-called brushed motor and a brushless motor can be adopted. The motor 200 is not limited to the electric motor, but may be a hydraulic motor.

The differential 210 is connected to a pair of output shafts 221a and 221b. The pair of output shafts 221a and 221b are connected to a pair of speed reducers 230a and 230b, respectively. The pair of speed reducers 230a and 230b each include a shaft to which the rotational force is inputted and a shaft to which a rotational force is outputted. The axis to which the rotational force is inputted and the axis to which the rotational force is outputted are arranged along the same rotational axis Cl. The pair of speed reducers 230a and 230b face each other along the rotation axis Cl.

The differential 210 performs a differential motion. The differential motion is an operation a difference (bias) between loads applied to the output shafts 221a and 221b is adjusted (eliminated). Specifically, the differential 210 is housed in a housing 220. The differential 210 includes a first bevel gear 211, a second bevel gear 212, a differential case 213, a pinion gear 214, and side gears 215 (first side gear 215a, second side gear 215b).

When the motor 200 is driven, the motor shaft 200a is rotated, which rotates a transmission shaft 201. When the transmission shaft 201 rotates, the rotational force of the transmission shaft 201 is transmitted to the first bevel gear 211. Consequently, the first bevel gear 211 is rotated. When the first bevel gear 211 rotates, the second bevel gear 212, which meshes with the first bevel gear 211, is rotated. The differential case 213 fixed to the second bevel gear 212 and the pinion gear 214 are rotated as the second bevel gear 212 rotates. When the pinion gear 214 rotates, the side gears 215 (first side gear 215a and second side gear 215b) that mesh with the pinion gear 214 rotate.

When the first side gear 215a rotates, the rotational force of the first side gear 215a is transmitted to the first speed reducer 230a via the first output shaft 221a. When the second side gear 215b rotates, the rotational force of the second side gear 215b is transmitted to the second speed reducer 230b via the second output shaft 221b.

The first speed reducer 230a is rotated by the rotation of the first output shaft 221a. The second speed reducer 230b is rotated by the rotation of the second output shaft 221b. In this way, the rotation of the motor shaft 200a is transmitted to the two speed reducers 230a and 230b via the transmission shaft 201 and the differential 210. The outputs of these two speed reducers 230a and 230b are transmitted to the bucket 110.

As for the differential motion, meshing timings of the gears in the two speed reducers 230a and 230b may differ due to a slight fabrication error of the gears and an assembly error. Therefore, at the time of an initial operation of the differential 210, loads applied to the output shafts 221a and 221b connected to the speed reducers 221a and 221b respectively may be different. In this case, the speed reducers 230a and 230b are driven while there is a difference between the loads on the output shafts.

In the embodiment, the pinion gear 214 of the differential 210 is supported rotatably by the differential case 213. Thus, when the loads applied to the output shafts 221a and 221b are different from each other, the pinion gear 214 rotates to absorb the difference in the loads on the output shafts 221a and 221b. Consequently, the loads on the output shafts 76a and 76b are balanced, and the rotation of the transmission shaft 201 is transmitted to the speed reducers 230a and 230b. This operation of eliminating the difference (bias) in the load between the output shafts 221a and 221b is the differential motion.

Further, the gear (for example, the pinion gear 214) in the differential 210 spins for a short time until the power is evenly distributed to the speed reducers 230a and 230b arranged on the left and right, and then the gear only revolves with the differential case 213 of the speed reducers 230. At this time, for example, if the power is continuously transmitted only between the pinion gear 214 and the side gear 215 while the pinion gears 214 and the side gears 215 are meshed at the same position, the pinion gears 214 and the side gears 215 may easily wear out by slight vibration. In this respect, the drive transmission device 120 according to the embodiment is provided with the clutch 250, and the driving force from the motor 200 is directly transmitted through the output shafts 221a and 221b to the speed reducers 230.

<Clutch 250>

The clutch 250 is an example of a power transmission unit. The clutch 250 is provided, for example, between the differential 210 and the speed reducers 230 (reducers 230a, 230b) and acts on (for example, contacts or separates) the differential 210. The clutch 250 is switched between ON state and OFF state. Specifically, the OFF state of the clutch 250 (separated state: first state) is a state in which the differential motion is performed More specifically, the OFF state of the clutch 250 is a state in which the second bevel gear 212 and the power transmission unit 222 are separated from each other. Therefore, in the OFF state of the clutch 250, the pinion gear 214 and the side gear 215 rotate together with the second bevel gear 212, whereby the output shaft 221 is rotated.

Whereas in the ON state (contact state: second state) of the clutch 250, the differential motion is not performed by the differential 210. Specifically, when the clutch 250 is in the ON state, the output shaft 221 rotates together with the power transmission unit 222. Thus, in the ON state (contact state) of the clutch 250, the second bevel gear 212 and the power transmission unit 222 come into contact with each other, and the power transmission unit 222 rotates following the rotation of the second bevel gear 212. As a result, the rotational force of the second bevel gear 212 is directly transmitted to the output shaft 221. As described above, in the contact state, the output shaft 221 is rotated by the direct rotation transmission from the second bevel gear 212 and the rotation transmission though the side gear 215.

The control unit 280 switches the clutch 250 between the ON state or the OFF state based on difference information regarding a difference in rotation between the pair of speed reducers 230a and 230b. The difference information is information indicating a difference in torque between the pair of speed reducers 230a and 230b. The difference information may be information indicating a difference in rotation between the pair of speed reducers 230a and 230b.

There is a correlation between the difference in rotations of the pair of speed reducers 230a and 230b and information regarding the rotation inputted from the motor 200 to the differential 210. The information regarding the rotation inputted from the motor 200 to the differential 210 is information regarding an input torque. The information regarding the rotation inputted from the motor 200 to the differential 210 may be information regarding the number of rotations or rotation speed. The information regarding the rotation inputted from the motor 200 to the differential 210 will be hereunder described as the information regarding the input torque. However, the same applies to the information regarding the number of rotations.

Specifically, the correlation between the input torque and the difference in rotation between the pair of speed reducers 230a and 230b is the relationship in which the larger the difference in rotation between the pair of speed reducers 230a and 230b, the larger the input torque inputted to the differential 210. There is also a correlation between the input torque inputted to the differential 210 and the current value of the motor 200. Specifically, for example, the larger the input torque inputted to the differential, the larger the current value of the motor 200.

Therefore, it can be said that there is a correlation between the difference in rotations of the pair of speed reducers 230a and 230b and the current value of the motor 200. In the embodiment, the difference information is information indicating the current value of the motor 200. The current value of the motor 200 can be obtained from, for example, a command value of the motor 200.

In the embodiment, the control unit 280 switches the clutch 250 to the OFF state (separated state) until the input torque inputted to the differential 210 reaches a threshold value, and causes the differential to perform the differential motion. When the input torque becomes equal to or higher than the threshold value, the control unit 280 switches the clutch 250 to the ON state (contact state) to transmit the driving force of the motor 200 directly from the output shafts 221a and 221b to the speed reducers 230. The threshold value is, for example, an estimated value at which the imbalance between the loads applied to the output shafts 221a and 221b can be eliminated at the time of the initial movement of the operating unit 104. Specifically, the threshold value may be expressed as a ratio to the current value (100%) at which the rated torque is obtained, and is, for example, 10% of the rated torque.

<Hardware Configuration Example of Control Unit 280>

Figure 4:
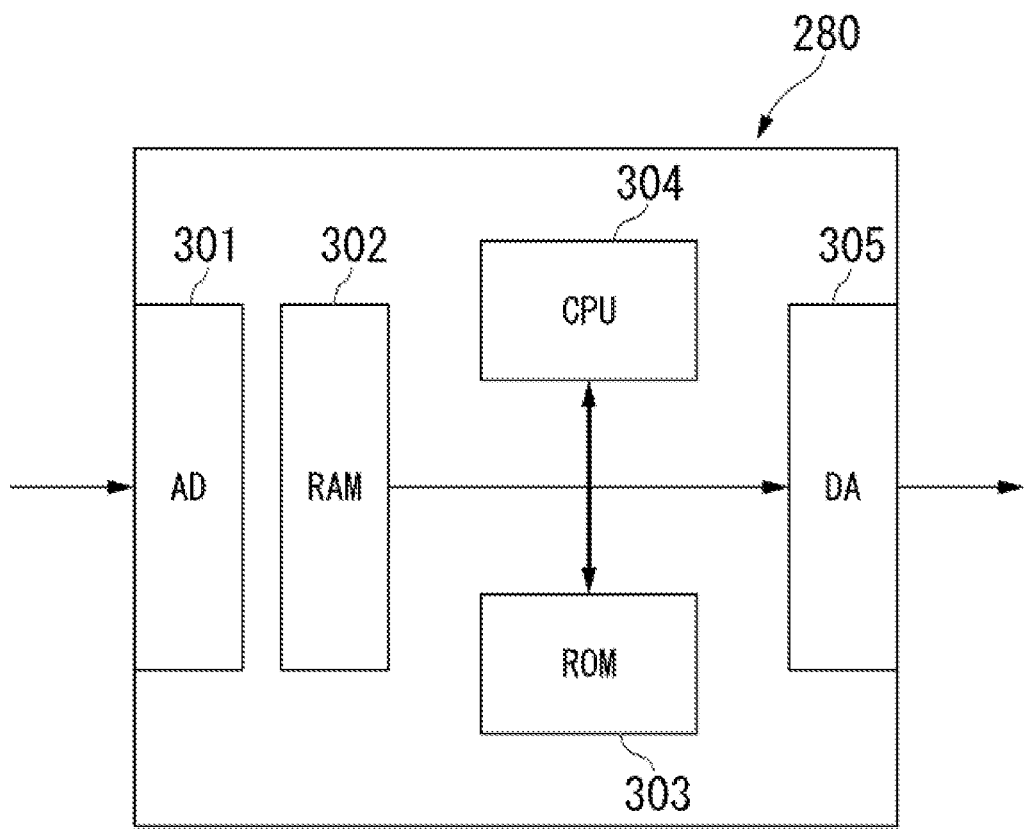
FIG. 4 is an explanatory diagram showing an exemplary configuration of hardware of a control unit of FIG. 3.

FIG. 4 is an explanatory diagram showing an exemplary configuration of hardware of the control unit 280. As shown in FIG. 4, the control unit 280 includes an AD (analog to digital) converter 301, a RAM (random access memory) 302, a ROM (read only memory) 303, a CPU (central processing unit) 304, and a DA (digital to analog) converter 305.

The AD converter 301 converts an analog signal from an operation device and an analog signal such as a current value of the motor 200 into digital signals. The RAM 302 is a memory that can store a threshold value used for controlling ON/OFF of the clutch 250, control values of the motor 200, and various other data. The ROM 303 stores a drive transmission program for operating the CPU 304. The CPU 304 sends a control signal for switching the clutch 250 according to the drive transmission program stored in the ROM 303. The DA converter 305 converts the control signal, which is a digital value calculated by the CPU 304, into an analog signal.

<Example of Drive Transmission Process Performed by Control Unit 280 of Embodiment>

Figure 5:
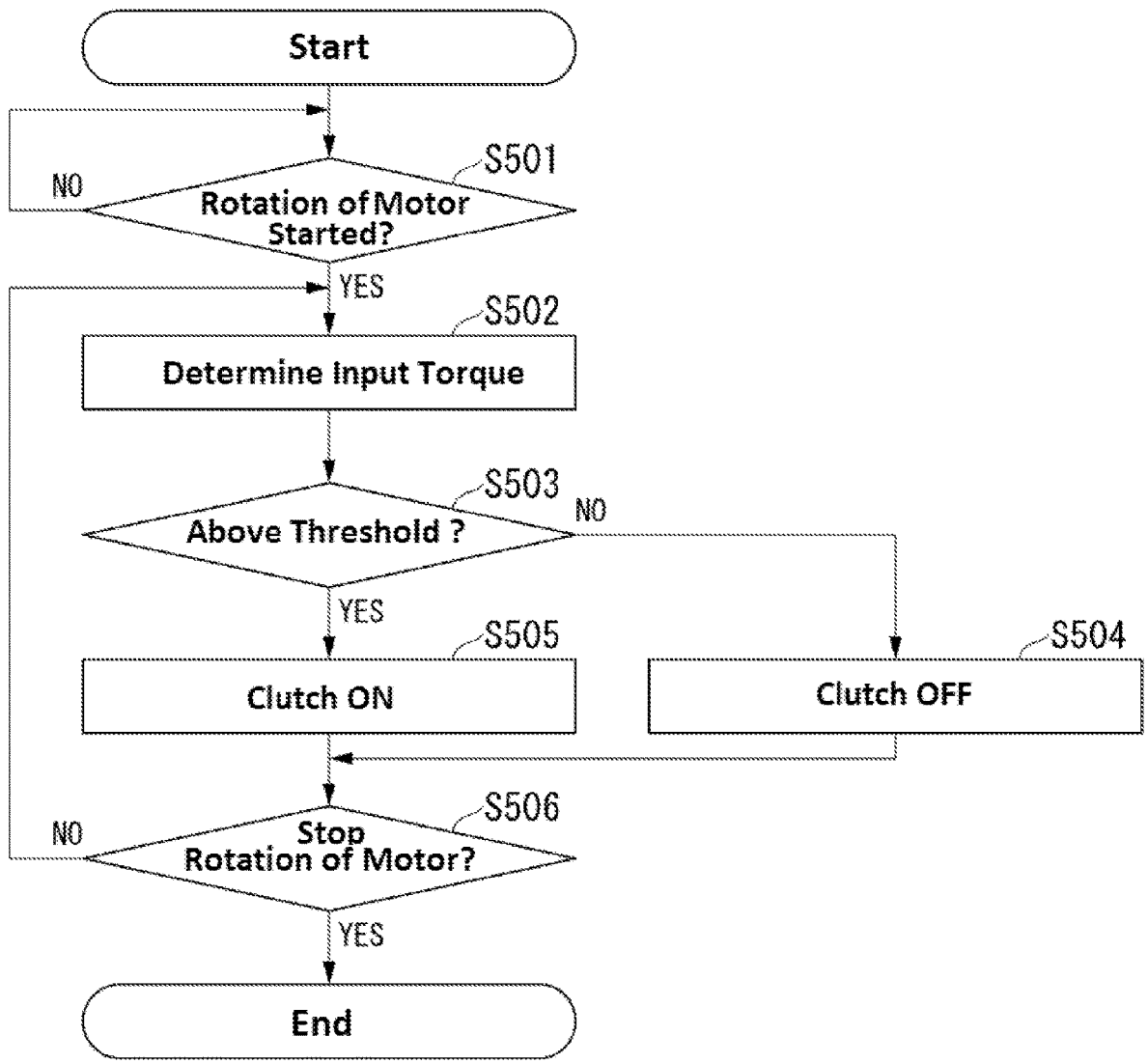
FIG. 5 is a flowchart showing an exemplary drive transmission process performed by the control unit of the embodiment.

FIG. 5 is a flowchart showing an exemplary drive transmission process performed by the control unit 280 of the embodiment. As shown in FIG. 5, the control unit 280 determines whether to start to rotate the motor 200 (step S501). The control unit 280 waits until the rotation of the motor 200 is started (step S501: NO), and when the rotation of the motor 200 is started (step S501: YES), detects the input torque based on the current value of the motor 200 (step S502).

The control unit 280 then determines whether the input torque (current value of the motor 200) is equal to or greater than the threshold value (step S503). When the input torque is not equal to or greater than the threshold value (step S503: NO), the control unit 280 switches the clutch 250 to OFF (separated state) (step S504) to cause the differential 210 to perform the differential motion. The process proceeds to step S506. Whereas when the input torque is equal to or greater than the threshold value (step S503: YES), the control unit 280 switches the clutch 250 to ON (contact state) (step S505). That is, the control unit 280 causes the driving force of the motor 200 to be transmitted directly from the output shafts 221a and 221b to the speed reducers 230.

Subsequently, the control unit 280 determines whether to stop the rotation of the motor 200 (step S506). When the control unit determined not to stop the rotation of the motor 200 (step S506: NO), the control unit 280 returns to step S502. Whereas when the control unit determined to stop the rotation of the motor 200 (step S506: YES), the control unit 280 ends the series of steps.

As described above, the drive transmission device 120 in the embodiment switches between the separated state and the contact state of the clutch 250 based on the difference information of the pair of speed reducers 230. After the difference in the load between the pair of output shafts 221 is eliminated by the differential motion of the differential 210, the driving force inputted from the motor 200 to the differential 210 is transmitted to the output shaft 221 not only through the rotation of the side gear 215 but also directly transmitted to the output shaft 221 from the second bevel gear 212. Thus, the power transmission is not continuously limited to only between the gears of the differential 210 (for example, between the pinion gear 241 and the side gear 215). Therefore, wear of the gears (for example, the pinion gear 241 and the side gear 215) can be suppressed. In this way, according to the embodiment, it is possible to prevent a shortened product life of the differential 210.

Further, in the embodiment, the difference information is information indicating the input torque inputted from the motor 200 to the differential 210. Therefore, the difference information can be easily obtained without separately providing a sensor or the like. Moreover, even when the difference information is information indicating the number of rotations inputted from the motor 200 to the differential 210, the difference information can be easily obtained in the same manner.

Further, in the embodiment, the drive transmission device 120 switches the clutch 250 to the OFF state (separated state) until the value indicated by the difference information reaches the threshold value, and switches the clutch 250 to the ON state (contact state) when the value reaches to the threshold value. Thus, when the driving of the motor 200 is started to start the operation of the operating unit 104, the difference in the load between the pair of output shafts 221 is eliminated by the differential motion, and the driving force is directly outputted to the output shaft 221. Therefore, it is possible to prevent the power from being continuously transmitted only between the gears of the differential 210 after the load imbalance is eliminated. As a result, wear of the gears can be prevented.

MODIFICATION EXAMPLES OF EMBODIMENT

Modification examples of the embodiment will be now described below. In each of the following modification examples, description of the same components as the above-described embodiment will not be repeated. The following modification examples and the above-described embodiment may be combined adequately.

First Modification Example

A first modification example of the embodiment will be now described below. In the above-described embodiment, the clutch 250 is configured to be switched when the input torque of the differential 210 becomes equal to or greater than the threshold value. In the first modification example, in addition to this, the clutch 250 is also configured to be switched when the input torque becomes equal to or greater than a second threshold value larger than the threshold value (hereinafter referred to as "first threshold value").

In the first modification example, when a value indicated by the difference information reaches the second threshold value higher than the first threshold value, the control unit 280 switches the clutch 250 to the OFF state (separated state), and thereafter the control unit 280 controls the clutch 250 to return to the ON state (contact state). The second threshold value is a value estimated to cause a certain amount of load imbalance between the output shafts 221a and 221b due to the torsional rigidity inside the speed reducers 230a and 230b.

The first threshold value is, for example, a value of 10% of the current value at which the rated torque is obtained. The second threshold is, for example, a value of 40% of the current value at which the rated torque is obtained. Note that the first threshold value and the second threshold value may be set to any values.

<Example of Drive Transmission Process Performed by Control Unit 280 of First Modification Example>

Figure 6:
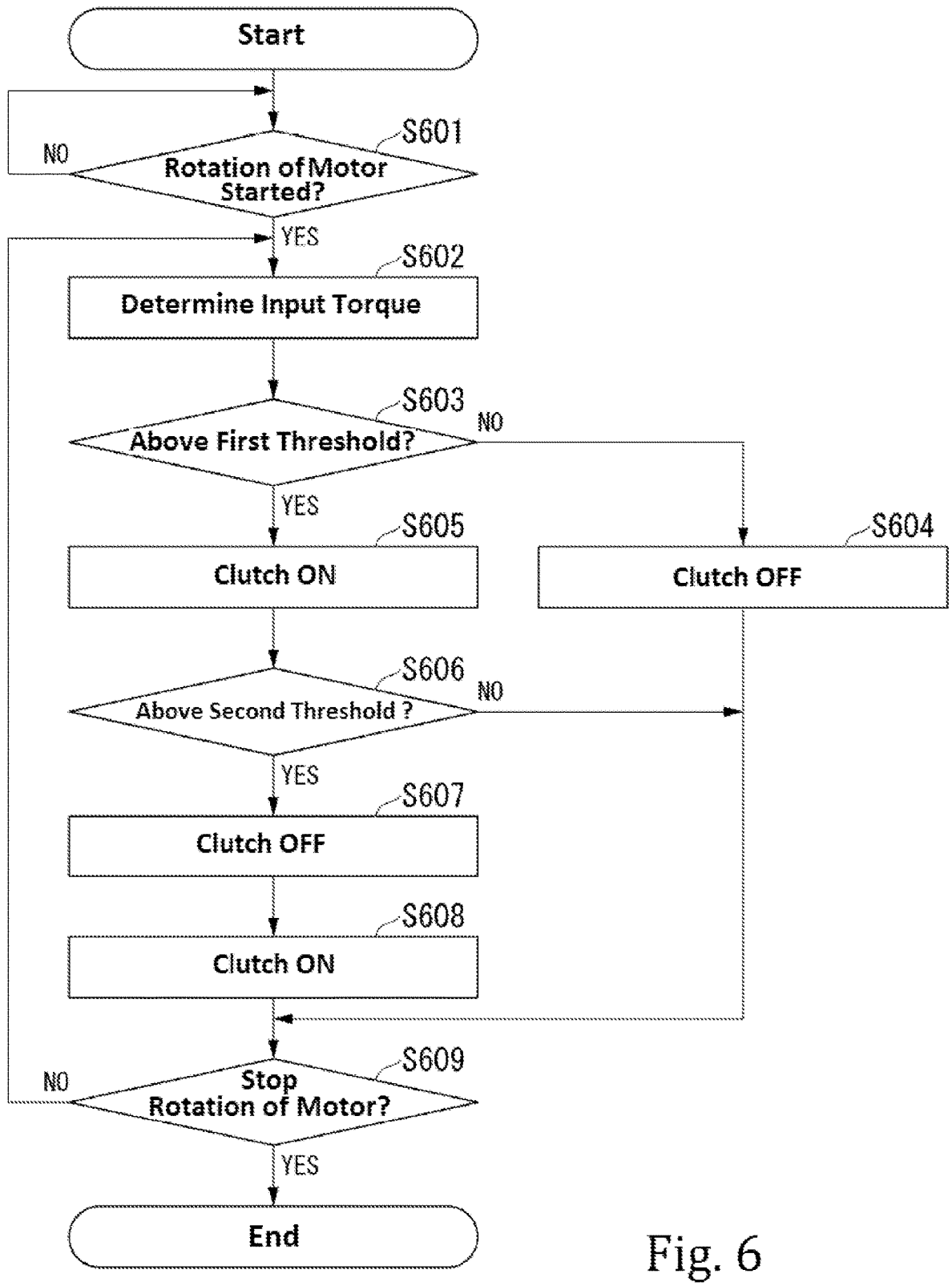
FIG. 6 is a flowchart showing an exemplary drive transmission process performed by a control unit of a first modification example.

FIG. 6 is a flowchart showing an exemplary drive transmission process performed by the control unit 280 of the first modification example. As shown in FIG. 6, the control unit 280 determines whether to start to rotate the motor 200 (step S601). The control unit 280 waits until the rotation of the motor 200 is started (step S601: NO), and when the rotation of the motor 200 is started (step S601: YES), detects the input torque based on the current value of the motor 200 (step S602).

The control unit 280 then determines whether the input torque (current value of the motor 200) is equal to or greater than the first threshold value (step S603). When the input torque is not equal to or greater than the first threshold value (step S603: NO), the control unit 280 switches the clutch 250 to the OFF state (separated state) (step S604) to cause the differential 210 to perform the differential motion. The process proceeds to step S609. Thus, when the driving of the motor 200 is started to start the operation of the operating unit 104, the difference in the load between the output shafts 221a and 221b is eliminated by the differential motion.

Whereas when the input torque is equal to or greater than the first threshold value (step S603: YES), the control unit 280 switches the clutch 250 to the ON state (contact state) (step S605). That is, the control unit 280 causes the driving force of the motor 200 to be transmitted directly from the output shafts 221a and 221b to the speed reducers 230. As a result, after the load imbalance between the output shafts 221a and 221b is eliminated, the output shafts 221a and 221b are rotated by the direct transmission from the second bevel gear 212 and the transmission through the rotation of the side gear 215.

Subsequently, the control unit 280 determines whether the input torque (current value of the motor 200) is equal to or greater than the second threshold value (step S606). When the input torque is not equal to or greater than the second threshold value (step S606: NO), the control unit 280 proceeds to step S609. Whereas when the input torque is equal to or greater than the second threshold value (step S606: YES), the control unit 280 switches the clutch 250 to the OFF state (separated slate) (step S607). That is, the control unit 280 causes the differential 210 to perform the differential motion. In this way, even when the load imbalance between the output shafts 221a and 221b occurs due to the torsional rigidity inside the speed reducers 230a and 230b, the imbalance can be eliminated.

Next, the control unit 280 again switches the clutch 250 to the ON state (contact state) (step S608). That is, the control unit 280 causes the driving force of the motor 200 to be transmitted directly from the output shafts 221a and 221b to the speed reducers 230. Subsequently, the control unit 280 determines whether to stop the rotation of the motor 200 (step S609). When the control unit determined not to stop the rotation of the motor 200 (step S609: NO), the control unit 280 returns to step S602. Whereas when the control unit 280 determined to stop the rotation of the motor 200 (step S609: YES), the control unit 280 ends the series of steps.

When the value indicated by the difference information reaches the second threshold value, the drive transmission device 120 of the first modification example switches the clutch 250 to the separated state and causes the differential 210 to perform the differential motion. Thus, even when the load imbalance between the output shafts 221 occurs due to the torsional rigidity inside the speed reducers, the imbalance can be eliminated by the differential motion of the differential 210. The drive transmission device 120 then switches the clutch 250 to the contact state, and directly transmits, to the output shaft 221, the drive force inputted from the motor 200 to the differential 210. As described above, each output shaft 221 is rotated by the direct rotation transmission from the second bevel gear 212 and the rotation transmission though the side gear 215. Thus, the power transmission is not continuously limited to only between the gears of the differential 210 (for example, between the pinion gear 241 and the side gear 215). Therefore, it is possible to reduce the wear of the gears (for example, the pinion gear 241 and the side gear 215), and it is possible to prevent the shortening of the product life of the differential 210.

Second Modification Example

A second modification example of the embodiment will be now described below. In the above embodiment, the difference information is information indicating the input torque inputted from the motor 200 to the differential 210. Whereas in the second modification example, the difference information is information indicating an output torque outputted from the differential 210 to the speed reducers 230a and 230b (that is, the torque inputted to the speed reducers 230a and 230b). The output torque is the sum of two torques outputted from the differential 210 to the two speed reducers 230a and 230b respectively. The output torque is determined by a torque sensor.

The control unit 280 controls the switching of the clutch 250 based on the output torque and the threshold value. Specifically, the control unit 280 controls the switching of the clutch 250 when the output torque becomes equal to or greater than the threshold value. More specifically, the control unit 280 keeps the clutch 250 in the OFF state (separated state) until the output torque becomes equal to or greater than the threshold value, so that the differential 210 performs the differential motion. Whereas when the output torque exceeds the threshold value, the control unit 280 switches the clutch 250 to the ON state (contact state), and directly transmit, to the output shaft 221, the driving force inputted from the motor 200 to the differential 210.

In the second modification example, the clutch 250 is switched to the ON or OFF state based on the output torque outputted from the differential 210 to the speed reducers 230a and 230b. With this configuration, the drive force is also not continuously transmitted to between the gears of the differential 210 (for example, between the pinion gear 241 and the side gear 215). Therefore, wear of the gears (for example, the pinion gear 241 and the side gear 215) can be suppressed.

Third Modification Example

A third modification example of the embodiment will be now described below. In the above second modification example, the difference information was the output torque, which is the sum of two torques outputted from the differential 210 to the two speed reducers 230a and 230b respectively. In the third modification example, a case where the difference information is a value indicating a difference in output rotation between the pair of speed reducers 230a and 230b will be described.

Specifically, in the third modification example, the value indicating a difference in output rotation is, for example, a difference between the output values outputted from the two speed reducers 230a and 230b. The output value is, for example, the output torque outputted from each of the speed reducers 230a and 230b. Alternatively, the output value may be the number of rotations or a rotation speed outputted by each of the speed reducers 230a and 230b.

The difference information may be information indicating a difference in input rotation between the pair of speed reducers 230a and 230b. Specifically, the value indicating a difference in input rotation is, for example, a difference between input values inputted to the two speed reducers 230a and 230b. The output value is, for example, an input torque inputted to the speed reducers 230a and 230b respectively. Alternatively, the input value may be the number of rotations or a rotation speed inputted to each of the speed reducers 230a and 230b. The torque is determined by a torque sensor. The number of rotations or rotation speed is detected by a rotation sensor.

<Example of Drive Transmission Process Performed by Control Unit 280 of Third Modification Example>

Figure 7:
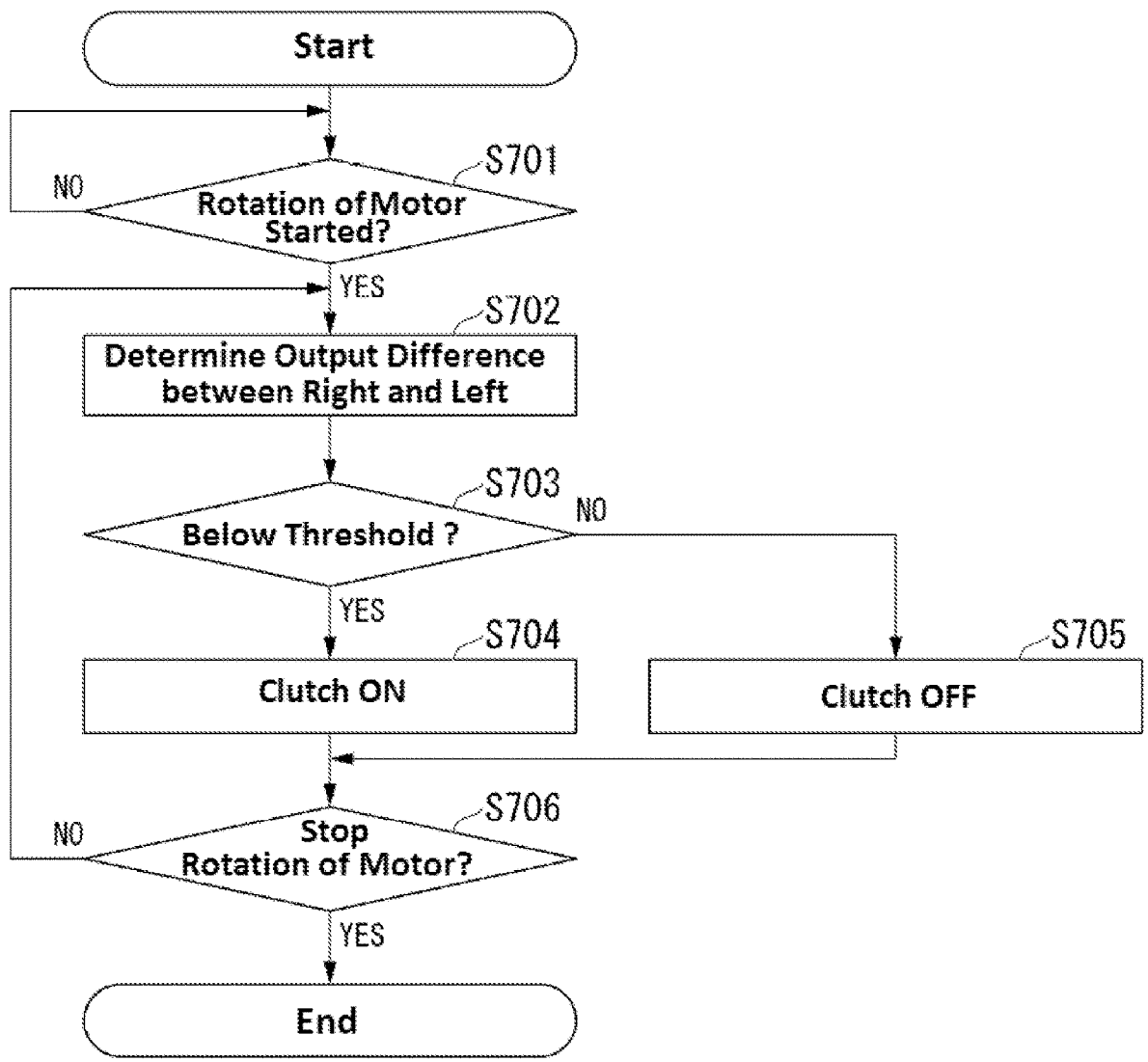
FIG. 7 is a flowchart showing an exemplary drive transmission process performed by a control unit of a third modification example.

FIG. 7 is a flowchart showing an exemplary drive transmission process performed by the control unit 280 of the third modification example. As shown in FIG. 7, the control unit 280 determines whether to start to rotate the motor 200 (step S701). The control unit 280 waits until the rotation of the motor 200 starts (step S701: NO) and once the rotation of the motor 200 is started (step S701: YES), the control unit 280 uses a detection result obtained from the torque sensor to determine an output difference in the output torque between the speed reducers 230a and 230b (step S702).

The control unit 280 subsequently determine whether the output difference is less than or equal to a threshold value (step S703). When the output difference is equal to or less than the threshold value, it is estimated that the loads applied to the output shafts 221a and 221b are balanced. When the output difference is equal to or less than the threshold value (step S703: YES), that is, when it can be estimated that the loads applied to the output shafts 221a and 221b are balanced, the control unit 280 switches the clutch 250 to the ON state (contact state) (Step S704) to transmit the driving force of the motor 200 directly from the output shafts 221a and 221b to the speed reducers 230. The control unit 280 then proceeds to step S706.

When the output difference is not equal to or less than the threshold value (step S703: NO), that is, when it can be estimated that the loads applied to the output shafts 221a and 221b are imbalanced, the control unit 280 switches the clutch 250 the OFF state (separated state) (Step S705). That is, the control unit 280 causes the differential 210 to perform the differential motion. In this way, it is possible to reduce (make it equal to or less than the threshold value) the output difference in the output torque between the pair of speed reducers 230a and 230b.

That is, when the loads applied to the output shafts 221a and 221b are imbalanced, the imbalance can be eliminated each time the imbalance occurs. Thereafter it becomes possible to proceed to step S704 from step S703 (YES). Consequently, the driving force of the motor 200 is transmitted directly from the output shafts 221a and 221b to the speed reducers 230.

Subsequently, the control unit 280 determines whether to stop the rotation of the motor 200 (step S706). When the control unit determined not to stop the rotation of the motor 200 (step S706: NO), the control unit 280 returns to step S702. Whereas when the control unit 280 determined to stop the rotation of the motor 200 (step S706: YES), the control unit 280 ends the series of steps.

According to the third modification example, the imbalance can be eliminated each time the difference in the output torque between the pair of speed reducers 230 exceeds the threshold value, that is, each time it is estimated that the loads on the output shaft 221 is imbalanced. After the imbalance of the load between the pair of output shafts 221 is eliminated, the driving force inputted from the motor 200 to the differential 210 is transmitted to the output shaft 221 not only through the rotation of the side gear 215 but also directly from the second bevel gear 212. Thus, the power transmission is not continuously limited to only between the gears of the differential 210 (for example, between the pinion gear 241 and the side gear 215). Therefore, wear of the gears (for example, the pinion gear 241 and the side gear 215) can be suppressed.

Forth Modification Example

A fourth modification example of the embodiment will be now described below. In the above embodiment, the difference information is obtained directly from the information indicating the input torque inputted to the differential 210. In the fourth modification example, the difference information is time information obtained from a timer. In the fourth modified example, it is assumed that the relationship between the time and torque is known in advance. That is, it is premised that there is a correlation between the time information obtained from the timer and the information indicating the input torque. More specifically, it is assumed that there is a correlation between the time and torque such that the input torque is T0 at time t0 and the input torque is T1 at time t1 at each operation performed by the operating unit 104. The control unit 280 controls the switching of the clutch 250 based on the time information.

Specifically, the control unit 280 controls the switching of the clutch 250 when a predetermined first period of time has passed. The first period of time is the time when the output torque is estimated to be equal to or higher than the threshold value. More specifically, the control unit 280 keeps the clutch 250 in the OFF state (separated state) until the first period of time passes, so that the differential 210 performs the differential motion. Whereas when the first period of time has passed, the control unit 280 switches the clutch 250 to the ON state (contact state) to transmit the driving force of the motor 200 directly from the output shafts 221a and 221b to the speed reducers 230.

If a time period (a second period of time) after which the load imbalance between the output shafts 221a and 221b occurs due to the torsional rigidity inside the speed reducers 230a and 230b is known, the control unit 280 switches the clutch 250 to the OFF state (separated state) after the second period of time. That is, the control unit 280 causes the differential 210 to perform the differential motion. In this way, even when the load imbalance between the output shafts 221a and 221b occurs due to the torsional rigidity inside the speed reducers 230a and 230b, the imbalance can be eliminated based on the information from the timer. Subsequently, the control unit 280 again switches the clutch 250 to the ON state (contact state).

In the fourth modification example, the clutch 250 is switched between the ON state and OFF state based on the time information obtained from the timer. With this configuration, the drive force is also not continuously transmitted to between the gears of the differential 210 (for example, between the pinion gear 241 and the side gear 215). Therefore, wear of the gears (for example, the pinion gear 241 and the side gear 215) can be suppressed.

Fifth Modification Example

A fifth modification example of the embodiment will be now described below. In the above third modification example, the case where the difference information is a value indicating the difference in the output rotation between the pair of speed reducers 230a and 230b has been described. In the fifth modification example, a case where the difference information is a value indicating rotation of one of the pair of speed reducers 230a and 230b will be described.

In the fifth modification example, the value indicating the rotation of one of the pair of speed reducers 230a and 230b is, for example, an output value of one of the two speed reducers 230a and 230b. The output value is, for example, the output torque outputted from one of the speed reducers 230a and 230b. Alternatively, the output value may be the number of rotations or a rotation speed outputted by one of the speed reducers 230a and 230b.

Note that the value indicating the rotation of one of the pair of speed reducers 230a and 230b may be, for example, an output value of one of the two speed reducers 230a and 230b. The output value is, for example, an input torque inputted to one of the speed reducers 230a and 230b. Alternatively, the input value may be the number of rotations or a rotation speed inputted to one of the speed reducers 230a and 230b.

The control unit 280 keeps the clutch 250 in the OFF state (separated state) until the output value of one of the two speed reducers 230a and 230b reaches a threshold value, so that the differential 210 performs the differential motion. Whereas when the output value reaches the threshold value, the control unit 280 switches the clutch 250 to the ON state (contact state) to transmit the driving force of the motor 200 directly from the output shafts 221a and 221b to the speed reducers 230.

In the fifth modification example, the control unit switches the clutch 250 between the ON state or the OFF state based on the value indicating the rotation of one of the pair of speed reducers 230a and 230b. With this configuration, the drive force is also not continuously transmitted to between the gears of the differential 210 (for example, between the pinion gear 241 and the side gear 215). Therefore, wear of the gears (for example, the pinion gear 241 and the side gear 215) can be suppressed.

A program for realizing the drive transmission device 120 described above may be stored on a computer-readable storage medium, and the program may be loaded to a computer system to execute the program. The term "computer system" as used herein includes hardware such as an OS and peripheral devices. The "computer-readable storage medium" refers to a storage device such as portable medium including a flexible disc, a magneto-optical disc, a ROM, and a CD-ROM, and a hard disk built-in to the computer system. Further, the "computer-readable storage medium" includes storage that retain the program for some period of time, like a volatile memory (for example, RAM) in a computer system that operates as a server or a client receiving the program through a network such as the Internet or a communication line such as a telephone line. The computer program mentioned above may be transmitted from a computer system that includes a storage device or the like storing the program to another computer system through a transmission medium or by a transmission wave in a transmission medium. The "transmission medium" for transmitting the program refers to a medium that operates to transmit information, like a network (communication network) such as the Internet or a communication line (communication wire) such as the telephone line. Only a part of the functions described above may be implemented in the above program. Further, the functions described above may be implemented by a combination of the above program and other programs previously stored on the computer system. That is, the above program may be what is called a difference file (a difference program).

The foregoing is the description of the embodiments of the present invention with reference to the drawings. Specific configurations are not limited to the above embodiments but include design modifications within the purport of the present invention.

According to the foregoing embodiments and modification examples disclosed herein, a plurality of functions are distributively provided. Some or all of the functions may be integrated. Any one of the functions may be partly or entirely segmented into a plurality of functions, which are distributively provided. Irrespective of whether or not the functions are integrated or distributed, they are acceptable as long as they are configured to solve the problems.

What is claimed is:

1. A drive transmission device comprising:
   a pair of output shafts connected to a pair of speed reducers respectively, the pair of speed reducers facing each other;
   a differential receiving a driving force from a drive source and outputting the driving force to the pair of output shafts;
   a power transmission unit acting on the differential, the power transmission unit taking either one of a first state in which a load imbalance between the pair of output shafts is adjusted or a second state in which the pair of output shafts are rotated directly by the driving force; and
   a control unit switching the power transmission unit to the first state or the second state based on difference information regarding a difference in rotation between the pair of speed reducers, the difference information being information indicating a current value of the drive source,
   wherein the control unit maintains the power transmission unit in the first state until the current value of the drive source which is a value indicated by the difference information reaches a first threshold value, and switches the power transmission unit to the second state when the value reaches the first threshold value.

2. The drive transmission device of claim 1, wherein the control unit switches the power transmission unit to the first state when the value indicated by the difference information reaches a second threshold value higher than the first threshold value, and thereafter switches the power transmission unit to the second state.

3. A construction machine comprising:
a vehicle body;
a movable member rotatably supported by the vehicle body;
a drive transmission device for driving the movable member;
a drive source generating a driving force;
a pair of speed reducers disposed to face each other,
wherein the drive transmission device includes:
   a pair of output shafts connected to the pair of speed reducers, respectively;
   a differential receiving a driving force from the drive source and outputting the driving force to the pair of output shafts;
   a power transmission unit acting on the differential, the power transmission unit taking either one of a first state in which a load imbalance between the pair of output shafts is adjusted or a second state in which the pair of output shafts are rotated directly by the driving force; and
   a control unit switching the power transmission unit to the first state or the second state based on difference information regarding a difference in rotation between the pair of speed reducers, the difference information being information indicating a current value of the drive source,
wherein the control unit maintains the power transmission unit in the first state until the current value of the drive source which is a value indicated by the difference information reaches a first threshold value, and switches the power transmission unit to the second state when the value reaches the first threshold value.

4. A drive transmission method, comprising a step of causing a computer of a drive transmission device to perform a process of switching a power transmission unit to a first state or a second state based on difference information regarding a difference in rotation between a pair of speed reducers, the difference information being information indicating a current value of a drive source, and a step of maintaining the power transmission unit in the first state until the current value of the drive source which is a value indicated by the difference information reaches a first threshold value, and switching the power transmission unit to the second state when the value reaches the first threshold value,
wherein the drive transmission device includes:
   a pair of output shafts connected to the pair of speed reducers respectively, the pair of speed reducers facing each other;
   a differential receiving a driving force from a drive source and outputting the driving force to the pair of output shafts; and
   the power transmission unit acting on the differential, the power transmission unit taking either one of the first state in which a load imbalance between the pair of output shafts is adjusted or the second state in which the pair of output shafts are rotated directly by the driving force.

5. A non-transitory computer-readable storage medium storing a program for causing a computer of a drive transmission device to perform a step of switching a power transmission unit to a first state or a second state based on difference information regarding a difference in rotation between a pair of speed reducers, the difference information being information indicating a current value of a drive source, and a step of maintaining the power transmission unit in the first state until the current value of the drive source which is a value indicated by the difference information reaches a first threshold value, and switching the power transmission unit to the second state when the value reaches the first threshold value,
wherein the drive transmission device includes:
   a pair of output shafts connected to the pair of speed reducers respectively, the pair of speed reducers facing each other;
   a differential receiving a driving force from a drive source and outputting the driving force to the pair of output shafts; and
   the power transmission unit acting on the differential, the power transmission unit taking either one of the first state in which a load imbalance between the pair of output shafts is adjusted or the second state in which the pair of output shafts are rotated directly by the driving force.

* * * * *